United States Patent [19]

Bourne et al.

[11] 4,318,557
[45] Mar. 9, 1982

[54] LATCHING MECHANISM

[75] Inventors: William R. Bourne, Anaheim; Raymond E. Harmon, Villa Park; Bernard W. Henrichs, Tustin, all of Calif.

[73] Assignee: Hartwell Corporation, Placentia, Calif.

[21] Appl. No.: 82,641

[22] Filed: Oct. 9, 1979

[51] Int. Cl.³ .............................................. E05C 5/02
[52] U.S. Cl. ............................ 292/113; 292/DIG. 31
[58] Field of Search ....... 292/113, DIG. 31, DIG. 49, 292/66, 247

[56] References Cited

U.S. PATENT DOCUMENTS

| | | | |
|---|---|---|---|
| 3,026,133 | 3/1962 | Swanson | 292/DIG. 31 |
| 3,214,207 | 10/1965 | Swanson | 292/DIG. 31 |
| 4,053,177 | 10/1977 | Slammreich et al. | 292/113 |

Primary Examiner—Richard E. Moore
Attorney, Agent, or Firm—Lyon & Lyon

[57] ABSTRACT

A latching mechanism having a keeper, a mounting bushing, and an engaging member adapted to engage the keeper. A first compression link is adapted to pivot about the mounting bushing and a second compression link is pivotally connected both with the first compression link and the engaging member. A plane between the mounting bushing and the pivotal connection between the engaging member and the second compression link defines a load line. The connection between the first and second compression links is adapted to be moved from an initial or secured position adjacent the engaging member and on one side of the load line to a released or unlatched position spaced apart from the engaging member and on the opposite side of the load line.

3 Claims, 7 Drawing Figures

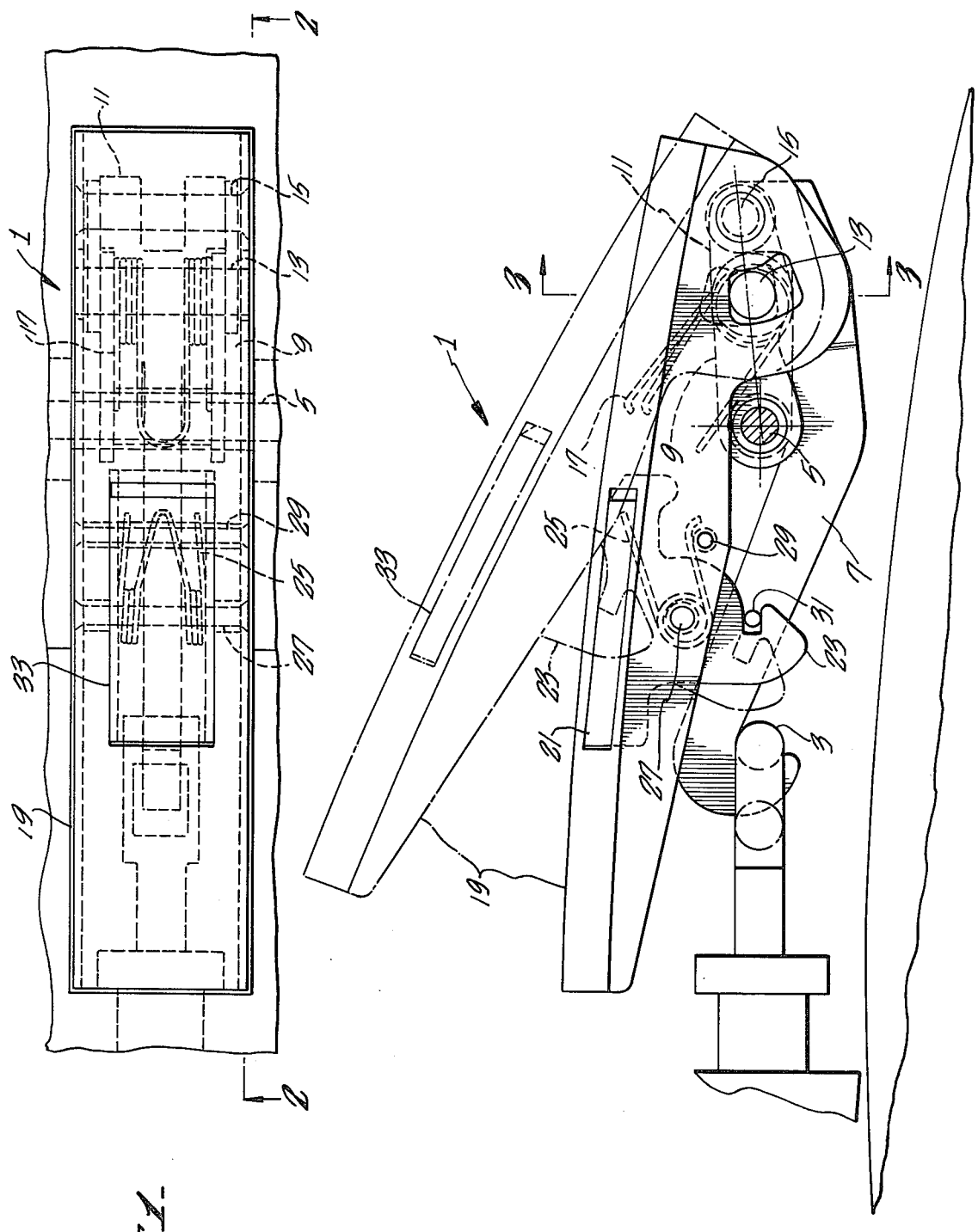

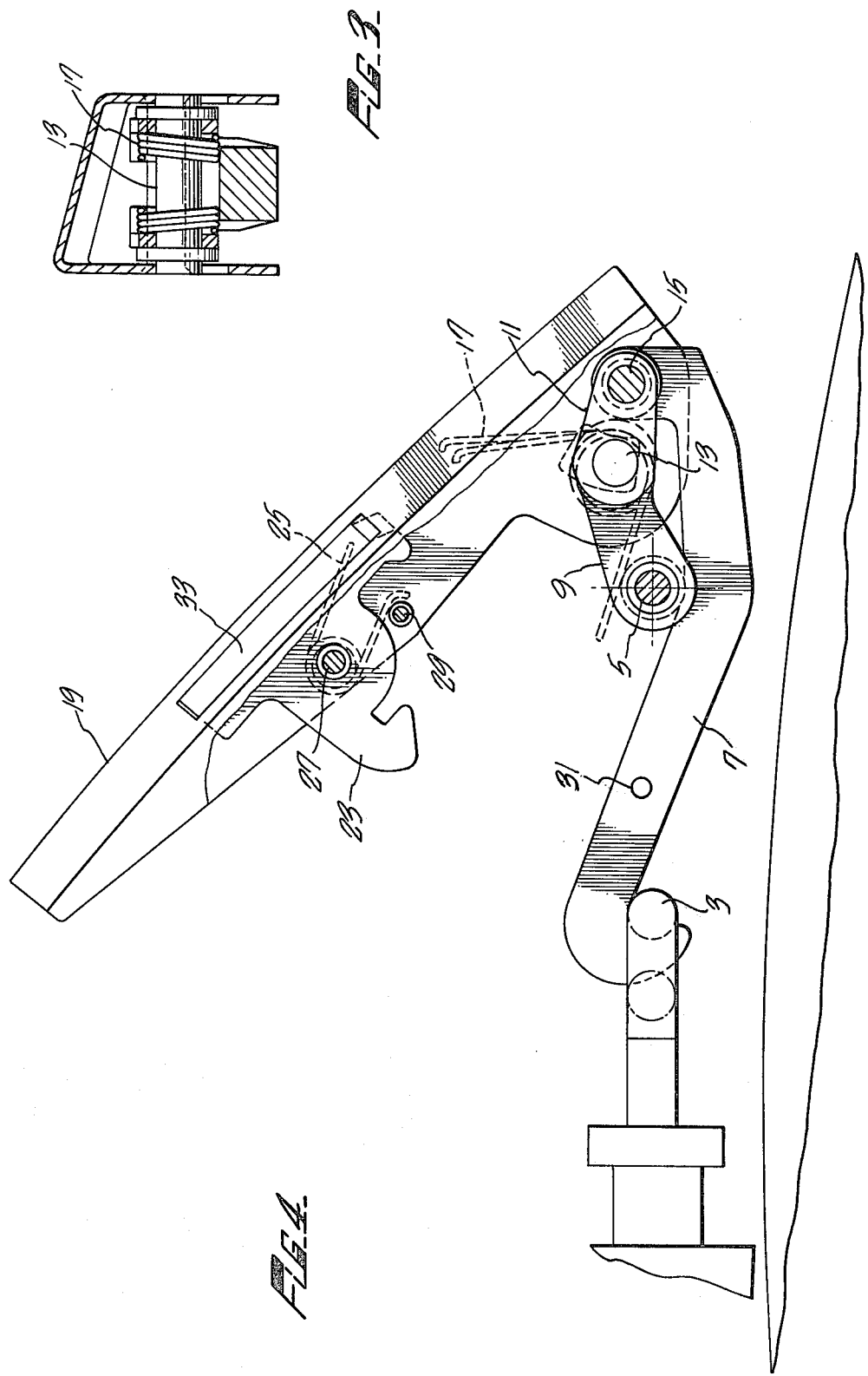

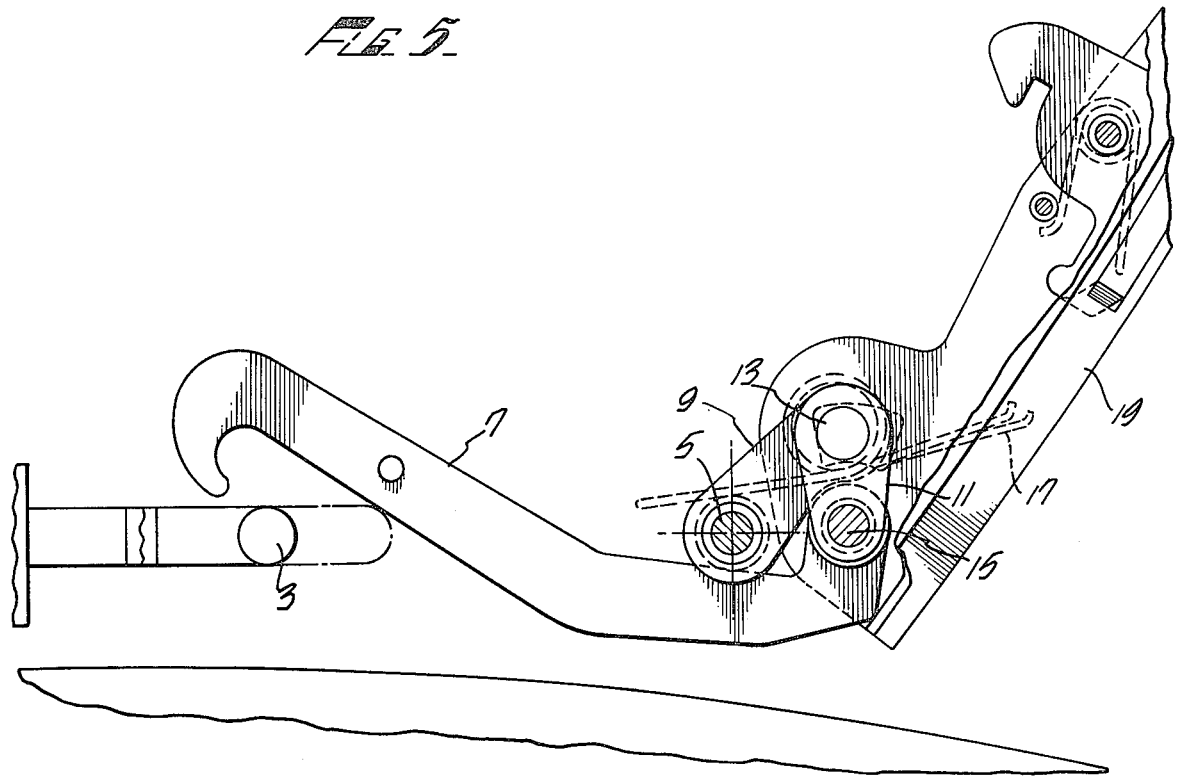

LATCHING MECHANISM

BACKGROUND OF THE INVENTION

This invention relates to a latching mechanism. More particularly, it relates to a latching mechanism wherein the mechanism travel is minimized when the mechanism is unlatched or released.

SUMMARY OF THE INVENTION

This invention relates to a latching mechanism having a keeper, a mounting bushing and an engaging or hooking member adapted to engage the keeper. A first compression link pivots about the mounting bushing and a second compression link is pivotally connected to the first compression link and the engaging member. The load line is defined as a plane between the mounting bolt and the pivotal connection between the hooking or engaging member and the second compression link. The connection between the first and second compression links is adapted to be moved from a secured or first position adjacent the engaging member, and on one side of the load line, to an unlatched or released position spaced apart from the engaging member and on the opposite side of the load line.

In a preferred embodiment a biasing or a spring means is positioned about the connection between the first and second compression links, purging the mounting bolt away from a handle which is connected to either of the first or second compression links.

The purpose of this invention is to provide an improved latching mechanism. Other objects and advantages of this invention will become evident upon a full reading of the specification, drawings and claims.

BRIEF DESCRIPTION OF THE DRAWINGS

FIG. 1 is a top view of the latching mechanism of this invention.

FIG. 2 is a sectional view through 2—2 of FIG. 1.

FIG. 3 is a sectional view through 3—3 of FIG. 2.

FIGS. 4 and 5 are side views of the latching mechanism of this invention illustrating the mechanism as it is unlatched.

DESCRIPTION OF PREFERRED EMBODIMENTS

Figure 6:
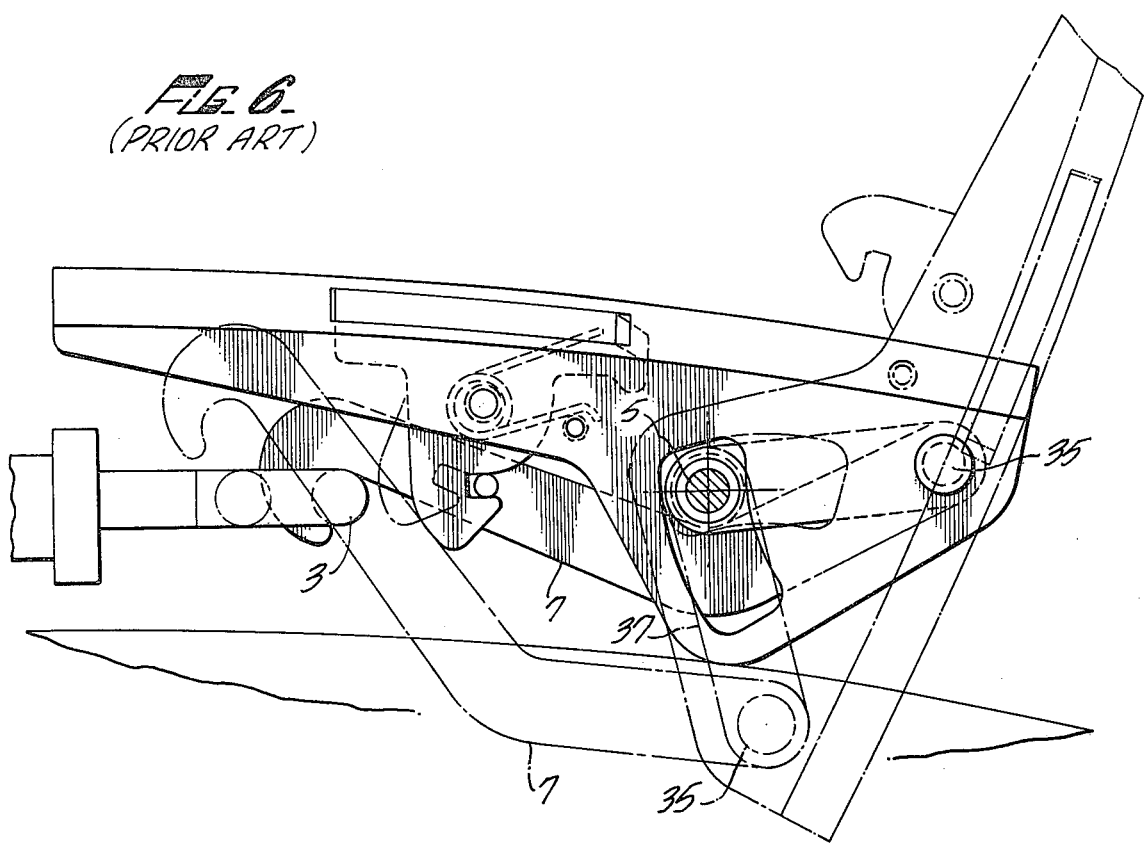
FIG. 6 is a side view of a prior art mechanism.

Referring now to FIG. 2, the latching mechanism 1 includes a keeper 3, a mounting bushing 5, for mounting the latching mechanism to a frame (not shown) and a keeper engaging member 7. First compression link 9 connects the mounting bushing 5 with a first moving pivot 13. Second compression link 11 connects the first moving pivot 13 with a second moving pivot 15.

Biasing means 17 are placed about the first moving pivot 13. The importance of the spring about the first moving pivot 13 is two-fold. First of all, it initially pushes the handle 19 into a free travel position as indicated by the dotted lines of FIG. 2. Secondly, it maintains the keeper engaging member 7 in communication with the mounting bushing 5 in order to prevent the keeper engaging member 7 from dropping into engagement with the apparatus located within the cavity exposed by opening the latch. Additionally, the biasing means 17 assists in urging the handle 19 beyond the free travel position into the fully open position illustrated in FIG. 5. Biasing means 17 assists in controlling the keeper engaging member 7 when the latch is being closed by a force on the handle 19.

A latch release 21 is depressed in order to move the latching mechanism from a latched or secured position to a free travel position. Depression of a latch release 21 allows the hooking element 23 to become disengaged from pin 31 as the hooking element biasing means 25 secured to stop 29 is rotated about anchor pivot 27.

A comparison of FIG. 5 and FIG. 6 illustrates the advantage of the configuration of this invention. FIG. 5 and the dotted portion of FIG. 6 illustrate the latching mechanism of this invention and that of the prior art in a fully opened position. In the prior art device a single compression link 37 is provided between the mounting bushings 5 and movable pivot 35. Such a configuration produces a mechanism wherein a moving pivot rotates deeply into the cavity exposed by the opening of the latch. In contrast, the configuration of this invention allows for the opening of the latch without substantial intrusion into the cavity exposed upon opening the latch. An advantage of this configuration is that the latching mechanism may be more closely positioned with respect to the equipment to be exposed when the latch is open. For example, when the latching mechanism of this invention is utilized to provide access to an airplane engine through the airplane cowling, the cowling may be fabricated such that it is closer to the engine that would have been allowable with a latching mechanism as shown in FIG. 6 because less space is required for the latching mechanism to intrude into the cavity about which the latch is placed. Accordingly, such a configuration would allow for reduced expenses in manufacturing the cowling and reduced weight and wind drag with attendant savings and operational costs.

Figure 7:
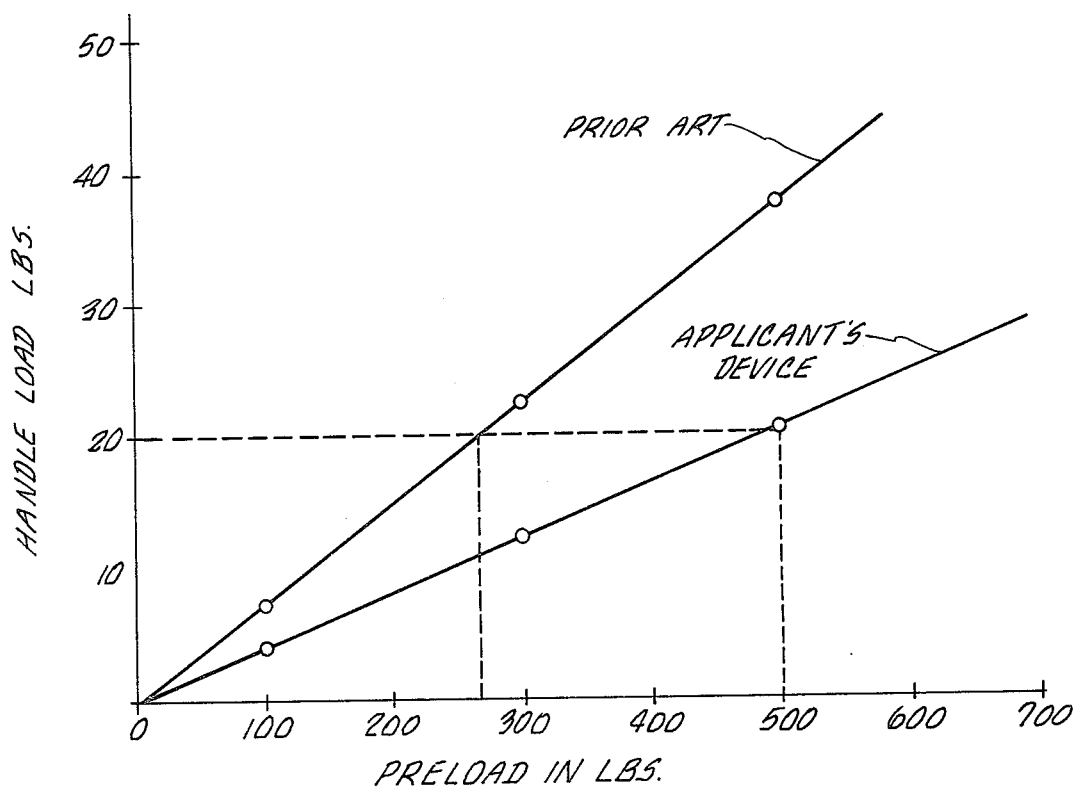
FIG. 7 is a comparison of the handle load versus pre-load of applicant's device and that of a prior art mechanism such as illustrated in FIG. 7.

FIG. 7 illustrates the handle load required to open the device for a given pre-load and shows that the device of this invention may be set with a higher pre-load for a given handle load. Alternately, the keeper engaging member 7 may include a recess adapted to be positioned so as to form first and second stopping means on either side of the primary load line, extending in the plane between said keeper 3 and said mounting bushings 5 for restraining the movement of the keeper engaging member 7 in the latched or restrained position.

Modifications and variations and the latching mechanism of this invention may be made in light of the teachings of this specification. It is therefore understood that the invention may be practiced otherwise than as specifically described yet within the scope of the claims attached hereto.

What is claimed is:

1. A latching mechanism comprising:
   a keeper;
   a mounting bushing;
   an engaging member adapted to engage said keeper;
   a first compression link for pivoting about said mounting bushing; and
   a second compression link pivotally connected both with said first compression link at a first moving pivot, and said engaging member at a second moving pivot, wherein a plane between said mounting bushing and said second moving pivot defines a load line and the first moving pivot between said first and second compression links is adapted to be moved from an initial or secured position adjacent said engaging member and/or one side of said load line to a released or unlatched position spaced apart from said engaging member and on the opposite side of said load line, wherein said mounting bushing is in slidable contact with said engaging member and thus controls the movement of the second moving pivot as the engaging member is in engagement with said keeper.

2. The mechanism claimed in claim 1 further including a biasing means positioned about said connection between said first and second compression links, urging said mounting bushing away from a handle connected to either of said first or second compression links.

3. The mechanism claimed in claim 1 where a biasing means is positioned about said first moving pivot and urges said engaging member into sliding contact with said bushing.

* * * * *